United States Patent Office 3,575,929
Patented Apr. 20, 1971

3,575,929
ACETYLENE-QUATERNARY AMMONIUM COMPOSITIONS
Loyd W. Jones, Tulsa, Okla., assignor to Pan American Petroleum Corporation, Tulsa, Okla.
No Drawing. Filed Dec. 31, 1964, Ser. No. 422,528
Int. Cl. C07c 87/30
U.S. Cl. 260—567.6     3 Claims

ABSTRACT OF THE DISCLOSURE

Acetylene or derivatives thereof are contacted with quaternary ammonium compounds to produce compositions of matter having biocidal activity.

---

The present invention relates to new compositions of matter and to their use as biocides. More particularly, it is concerned with a class of association complexes prepared from certain amine and acetylene compounds and their use as biocides in industrial water systems.

Generally, the new compositions of my invention are prepared from high molecular weight amines, salts thereof, or quaternary ammonium salts and acetylene, or derivatives thereof. While I have not established the structure of the complexes formed from the quaternary ammonium salts and acetylene compounds, they appear to be discrete chemical compositions having properties different from the compounds used in their preparation. The bonding forces involved in formation of these complexes may be the result of electrostatic fields around the highly acetylene-unsaturated acetylene linkage, hydrogen bonding or, in some instances, both.

Specifically, the amine compounds employed in the preparation of these new compositions are of two main classes, i.e., amines, including their salts, and the quaternary ammonium salts. The first of these classes has the general structural formula $$R—N—(R_2)_2$$

wherein R may be an aliphatic group of 11 to 21 carbon atoms, phenyl, naphthyl, furfuryl, tetrahydrofurfuryl, cyclohexyl and the radical $$R_1—NH—(CH_2)_y—$$

wherein $R_1$ represents an alkyl or alkylene group having from 8 to 18 carbon atoms and $y$ is an integer from 2 to 4; $R_2$ represents hydrogen or methyl; and salts of these amines.

Examples of suitable amines or their salts that may be employed are hexadecyl dimethyl amine, N-alkyl trimethylene diamine, designated as Duomeen C and sold by Armour Chemical Company. This particular material, hereinafter referred to as Duomeen C, has a molecular weight of about 321 and is a mixture of amines having N-alkyl groups containing from 8 to 18 carbon atoms, 47 percent of which have 12 carbon atoms. Other suitable amines are aniline, furfuryl amine, tetrahydrofurfuryl amine, naphthyl amine, cyclohexyl amine, N-octadecyl tetramethylene diamine, N-octyl ethylene diamine, N-dodecyl propylene diamine and stearyl, decyl and octyl amines. Acid salts, such as those derived from any of the above-mentioned amines, and a mineral acid or an organic acid, such as acetic, butyric and adipic, etc., may also be used.

The quaternary ammonium salts contemplated by my invention are illustrated by the following general structural formula:

$$R_3—N—(CH_3)_2—R_4X$$

in which $R_3$ represents an alkyl or alkylene group of from 8 to 18 carbon atoms, phenyl, naphthyl, furfuryl, tetrahydrofurfuryl, cyclohexyl and the redical $$R_1—NH—(CH_2)_y—$$

wherein $R_1$ represents an alkyl or alkylene group having from 8 to 18 carbon atoms and $y$ is an integer from 2 to 4; $R_4$ is methyl or benzyl; and X is a halogen.

The quaternary ammonium salts that can be used in preparing the association complexes of my invention include the mono-alkyl quaternary dimethyl ammonium halides and di-alkyl quaternary methyl ammonium halides. For example, 50 percent of the active components in compounds of this type consists of a mono-tallow trimethyl quaternary and 50 percent dicoco dimethyl quaternary. The dicoco group is derived from coconut oil fatty acids, ranging from $C_8$ to $C_{18}$. A water-soluble 50—50 mixture of the mono-tallow and dicoco quaternary ammonium chlorides (hereinafter referred to as Arquad T-2C) is frequently preferred and has an average molecular weight of 395. It is normally sold as a 50 percent active solution in ethyl alcohol. Additional quaternary ammonium salts suitable for use in preparation of the complexes of my invention are N-soya-trimethyl ammonium chloride, N-tallow-trimethyl ammonium chloride, N-octyl-trimethyl benzyl ammonium chloride, N-decyl-dimethyl benzyl ammonium chloride, N-octadecenyl trimethyl ammonium chloride, N-furfuryl trimethyl ammonium chloride, N-phenyl dimethyl benzyl ammonium chloride, N-naphthyl trimethyl ammonium chloride, N-cyclohexyl dimethyl benzyl ammonium chloride, N-tetrahydrofurfuryl trimethyl ammonium bromide, 1-(2-hydroxyethyl)-2-n- alkyl-1-benzyl-2-imidazolinium chloride, 1 - (2 - hydroxyethyl)-2-n-alkyl-1-(4-chlorobutyl)-2-imidazolinium chloride—in which the alkyl group may have from 16 to 18 carbon atoms and wherein there may be one or two points of unsaturation.

In addition to acetylene, examples of acetylenic compounds used in preparing these complexes include propargyl alcohol, propargyl chloride, bromide and iodide, propiolic acid, ethyl acetylene, vinyl acetylene, phenyl acetylene, diphenyl acetylene, methylbutynol, deca-5-yne-2,4,7,9-tetramethyl-4,7-diol, hexa-3-ol-1-yne, 2-methyl-3-butyne-2-ol, etc. These and other suitable acetylenic compounds are covered by the general formula $$R_5—C≡C—R_6$$

wherein $R_5$ represents hydrogen; $CH_2=CH—$, $CH_3—$, $C_2H_5—$, $COOH$, $CH_2OH—$, phenyl,

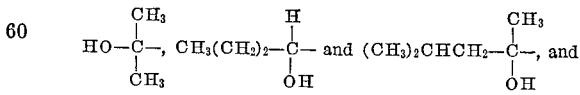

$R_6$ is a member of the group consisting of phenyl, hydrogen, CH₂X, where X is a halogen, such as bromine, chlorine, or iodine, and

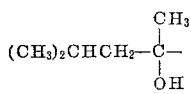

It is an object of my invention to provide a class of biocides capable of suppressing bacterial growth in industrial and other water systems over extended periods of time. It is another object of my invention to enhance and/or prolong the biocidal activity of known biocides by treatment thereof with an acetylenic compound.

The complexes of my invention are readily prepared by adding the acetylenic compound to an aqueous or organic solvent solution of the amine, amine salt, or quaternary ammonium salt. Usually, the acetylenic compound is employed in a molar excess of from about 2:1 to about 4 or 5:1. The operation may be effected at room temperature and atmospheric pressure, solution of the acetylenic compound usually occurring immediately. In the case of volatile acetylenes, like acetylene itself, it may be desirable to carry out the process under slightly increased pressures to aid in solution of a sufficient amount to produce the complex in biocidal concentrations. Alternatively, solution of larger amounts of acetylene or derivatives thereof can be obtained by the addition of acetone, alcohol, or other suitable solvents to the solution of the amine compound. Ordinarily, concentrations of these complexes of from 10 to about 30 p.p.m. are found to be entirely satisfactory for continued suppression of bacterial growth.

The resulting solution of the complex may then be stored in a closed container for further use. In the case of complexes made from acetylene, it is preferable to store such materials under a slight pressure of acetylene in order to be assured of a stock solution having the desired strength. Where these complexes are to be used in large quantities, such as in refineries, chemical plants, and in the secondary recovery of crude oil by waterflooding, said complexes may be prepared in the aqueous system being treated, i.e., the amine compound and acetylene are run into the water simultaneously at a rate that will produce the desired concentration of complex, typically 10 to 20 p.p.m.

Chemical treatment for control of microorganisms is a widespread practice in waterflooding operations, as well as in other water systems, such as in cooling towers, and the like. Broad spectrum biocides capable of inhibiting growth of a large variety of organisms are the most widely used materials. Application of treatment is usually governed by symptoms of need rather than by exact knowledge of the numbers and type of organisms present. However, it is usually necessary to change the type and amount of chemical toxicant from time to time to maintain control of the growth of these organisms. This is for the reason that after a time the bacteria seem to develop an immunity to such materials. Special treating techniques, such as periodic shock treatment with high concentrations of a biocide, are often applied. However, such methods fall far short of being satisfactory. While the quaternary ammonium compounds themselves—and acetylene compounds—are known biocides, it has been previously recognized that organisms belonging to the genus Pseudomonas, as well as other bacteria, eventually become resistant to almost any quaternary ammonium compound, and when this type of treatment is employed, Pseudomonas, if they are present originally, will tend to build up in the system to the point where other means must be used in order to inhibit their growth.

One of the outstanding advantages of these new association complexes of my invention is their ability not only to exhibit a highly effective initial kill, but also their ability to suppress bacterial growth to desirably low levels in systems of the type contemplated herein over extended periods of time.

A series of tests was carried out to demonstrate the ability of the above-mentioned complexes to inhibit bacterial growth of the type such as is encountered in cooling towers and waterflooding operations. These tests were of two types; the Flowing or Dynamic Test and the Static Biocide Tolerance Development Test. The Flowing test, in essence, is modeled after a full-scale water injection system employed in flooding operations. Water containing salts and organic nutrients is circulated through glass pipe containing exposed steel surfaces. The water passes through once and is discarded. The whole system is inoculated with known strains of bacteria common to waterflooding equipment. The piping is arranged in two identical sets of tubes, each connected in series. The bactericide being tested is injected between the two sets. Thus, the pipes downstream of the point of injection are always under treatment, while the upstream set serves as a control. Differences in the rate of bacterial growth in the treated and untreated sides of the system indicate the effectiveness of the material being tested. Standard laboratory tube and plate counting techniques are used to count the numbers of free-floating microorganisms in samples periodically removed from several points in the test apparatus. The counts generally rise and fall with variations in the level of microbial activity. The extent to which a chemical under test suppresses the bacterial count is a measure of effectiveness which is expressed as percent inhibition. The test organisms with which the system is generally inocculated are *Pseudomonas putrefaciens* and *Desulfovibrio desulfuricans*. Some secondary growths of other *Pseudomonas sp* were always noted, possibly indicating the inocculum was not totally pure. Prior to each test run, three successive transfers were made from a bacteria stock culture maintained at viable conditions to insure a vigorously vegetative population.

Growth rate in the flow test apparatus was followed by daily counts of free-floating organisms present in water samples removed from sampling points up- and downstream of the point of chemical injection.

The water samples were aseptically handled and serially diluted with sterile water to suitable concentrations. Aliquots were plated onto nutrient agar in petri dishes and incubated at 98° C. until countable colony growth occurred. The colony counts were translated to cells per milliliter in the original water and the numbers recorded as Total Aerobic Organisms. The difference in counts up- and downstream of the point of chemical injection was used to calculate the Percent Count Reduction in cell growth by the following equation:

$$\text{Percent} = \frac{(\text{Cells/ml.-Untreated}) - (\text{Cells/ml.-Treated}) \times 100}{\text{Cells/ml.-Untreated}}$$

Counts of anaerobic sulfate reducing bacteria were made by essentially the procedure set out in the American Petroleum Institute Recommended Practice 38.

In carrying out tests, the following materials were placed into 20 ml. culture tubes:

(1) 14.9 ml. of a 0.1% aqueous solution of Difco [1] nutrient broth
(2) 1.0 ml. of a 0.016% aqeuos solution of the biocide being tested. This provides 10 p.p.m. of active biocide compound in the final volume of 16.0 ml.
(3) 0.1 ml. of an aqueous suspension of vegetative bacteria cells (*Pseudomonas sp*).

For other biocide concentrations, the volumes of (1) and (2) were adjusted accordingly. The tube contents were mixed and then incubated at 98° F. for 48 hours. The numbers of surviving organisms were determined by standard plate counts using nutrient agar.

From each tube was taken 0.1 ml. of solution containing the surviving organisms. This was transferred aseptically ---
[1] A beef-peptone extract.

to freshly sterilized tubes containing the aqueous nutrient broth and biocide. The mixing, 48-hour incubation, and counting of surviving organisms was repeated. All tests were carried out in duplicate through six successive 48-hour transfer cycles. The numbers of surviving organisms after each 48-hour incubation (in the presence of the biocide) were determined as explained above.

EXAMPLE 1

The results outlined below were obtained in accordance with the procedure described above in connection with the Dynamic Flow Test and demonstrate the superior biocidal activity of the complexes of my invention over the individual compounds from which said complexes were prepared. Data showing the results separately obtained with the acetylene compound, the amine compound, and the complex at varying concentrations are set forth below:

ACETYLENE GAS ALONE AT 10 P.P.M.

| Test days: | Aerobic bacteria counts, million cells/milliliter | | Count reduction, percent of untreated |
|---|---|---|---|
| | Untreated | Treated | |
| 1 | 8.4 | 8.0 | 5 |
| 2 | 2.7 | 3.6 | 0 |
| 3 | (1) | | |
| 4 | 36.0 | 25.0 | 30 |
| 5 | | | |
| 6 | | | |
| 7 | 1.9 | 1.1 | 42 |
| 8 | 0.3 | 4.0 | 0 |
| 9 | 2.3 | 1.7 | 22 |

[1] Indicates counts missed or invalid.
NOTE.—Slime growth in untreated and treated cells.

ACETYLENE GAS ALONE AT 1,000 P.P.M.
[Water saturation concentration]

| Test days: | Aerobic bacteria counts, million cells/milliliter | | Count reduction, percent of untreated |
|---|---|---|---|
| | Untreated | Treated | |
| 1 | 1.5 | 0.5 | 67 |
| 2 | | | |
| 3 | | | |
| 4 | 11.5 | 13.0 | 0 |
| 5 | 10.6 | 1.6 | 85 |
| 6 | 2.4 | 2.0 | 16 |
| 7 | 2.6 | 3.0 | 0 |
| 8 | | | |
| 9 | | | |

NOTE.—Slime growth in untreated and treated cells.

ARQUAD T-2C AT 10 P.P.M. ACTIVE

| Test days: | Aerobic bacteria counts, million cells/milliliter | | Count reduction, percent of untreated |
|---|---|---|---|
| | Untreated | Treated | |
| 1 | | | |
| 2 | | | |
| 3 | 14.0 | 1.4 | 90.0 |
| 4 | 5.7 | 1.3 | 77.2 |
| 5 | 18.0 | 4.1 | 77.2 |
| 6 | 10.8 | 0.9 | 91.6 |
| 7 | 20.5 | 2.9 | 85.7 |
| 8 | 8.6 | 3.3 | 61.6 |
| 9 | 11.1 | 3.7 | 66.6 |

NOTE.—Slime growth in treated cells developed at six days.

ARQUAD T-2C AT 10 P.P.M. ACTIVE PLUS ACETYLENE GAS AT 1.0 P.P.M.

| Test days: | Aerobic bacteria counts, million cells/milliliter | | Count reduction, percent of untreated |
|---|---|---|---|
| | Untreated | Treated | |
| 1 | | | |
| 2 | | | |
| 3 | 4.6 | 0.2 | 95.6 |
| 4 | 39.3 | 0.6 | 98.4 |
| 5 | 42.5 | 0.9 | 97.8 |
| 6 | 23.0 | 1.0 | 95.6 |
| 7 | 11.6 | 0.3 | 97.3 |
| 8 | 96.0 | 0.7 | 99.1 |
| 9 | | | |

NOTE.—No slime growth in treated cells.

ARQUAD T-2C AT 3 P.P.M. ACTIVE PLUS ETHYL ACETYLENE AT 2 P.P.M.

| Test days: | Aerobic bacteria counts, million cells/milliliter | | Count reduction, percent of untreated |
|---|---|---|---|
| | Untreated | Treated | |
| 1 | 6.6 | 0.2 | 97.0 |
| 2 | 2.4 | 0.5 | 79.2 |
| 3 | | | |
| 4 | | | |
| 5 | | | |
| 6 | 1.7 | 0.2 | 88.2 |
| 7 | 3.6 | 0.1 | 97.2 |
| 8 | 23.0 | 1.1 | 95.2 |
| 9 | 19.4 | 1.8 | 90.6 |

NOTE.—No slime growth in treated cells.

ARQUAD T-2C AT 3 P.P.M. ACTIVE PLUS PROPARGYL-ALCOHOL AT 2 P.P.M.

| Test days: | Aerobic bacteria counts, million cells/milliliter | | Count reduction, percent of untreated |
|---|---|---|---|
| | Untreated | Treated | |
| 1 | 5.5 | 0.5 | 91.0 |
| 2 | 27.0 | 1.2 | 95.5 |
| 3 | | | |
| 4 | | | |
| 5 | 4.3 | 0.2 | 95.4 |
| 6 | 108.0 | 3.7 | 96.5 |
| 7 | | | |
| 8 | 16.3 | 2.0 | 85.7 |
| 9 | 5.2 | 0.9 | 82.6 |

NOTE.—No slime growth in treated cells.

HEXADECYL DIMETHYL PROPARGYL AMMONIUM BROMIDE AT 5 P.P.M. ACTIVE

| Test days: | Aerobic bacteria counts, million cells/milliliter | | Count reduction, percent of untreated |
|---|---|---|---|
| | Untreated | Treated | |
| 1 | | | |
| 2 | 2.7 | 0.8 | 70.4 |
| 3 | 24.5 | 2.1 | 91.4 |
| 4 | 4.1 | 1.5 | 63.4 |
| 5 | | | |
| 6 | | | |
| 7 | 13.6 | 2.0 | 85.3 |
| 8 | 34.7 | 2.6 | 92.4 |
| 9 | 16.0 | 1.0 | 93.8 |

NOTE.—No slime growth in treated cells.

DUOMEEN C AT 5 P.P.M. ACTIVE

| Test days: | Aerobic bacteria counts, million cells/milliliter | | Count reduction, percent of untreated |
|---|---|---|---|
| | Untreated | Treated | |
| 1 | 9.0 | 0.1 | 98.9 |
| 2 | | | |
| 3 | | | |
| 4 | 32.7 | 0.1 | 99.6 |
| 5 | 11.0 | 0.1 | 99.0 |
| 6 | 5.1 | 0.1 | 98.0 |
| 7 | 5.0 | 1.0 | 80.0 |
| 8 | 7.0 | 4.5 | 35.7 |
| 9 | 5.5 | 3.0 | 45.4 |

NOTE.—Slime growth in treated cells after six days.

COCO PROPYLENE DIAMINE (DUOMEEN C) PROPIOLATE AT 5 P.P.M. ACTIVE

| Test days: | Aerobic bacteria counts, million cells/milliliter | | Count reduction, percent of untreated |
|---|---|---|---|
| | Untreated | Treated | |
| 1 | | | |
| 2 | | | |
| 3 | 48.3 | 2.5 | 95.0 |
| 4 | 12.5 | 2.2 | 82.4 |
| 5 | 47.0 | 1.1 | 97.6 |
| 6 | 12.3 | 1.4 | 88.6 |
| 7 | 10.4 | 0.4 | 96.1 |
| 8 | | | |
| 9 | 4.6 | 0.3 | 93.4 |

NOTE.—No slime growth in treated cells.

EXAMPLE 2

The Static Biocide Tolerance Development Test was carried out in accordance with the general procedure outlined above, again using the individual compounds from which the tested complex was prepared, as well as testing the complex itself. The results obtained appear in the table below:

| | Surviving bacteria million cells/milliliter | | | | |
|---|---|---|---|---|---|
| Transfer Number [1] | Arquad T-2C at 10 p.p.m. | Propargyl alcohol at 10 p.p.m. | Arquad T-2C at 5 p.p.m. plus propargyl alcohol at 5 p.p.m. | Arquad T-2C at 10 p.p.m. plus propargyl alcohol at 10 p.p.m. | Untreated control |
| 1 | 25 | TNTC [2] | 24 | 33 | TNTC |
| 2 | >100 | TNTC [2] | >100 | 21 | TNTC |
| 3 | >100 | TNTC [2] | TNTC | 36 | TNTC |
| 4 | 48 | TNTC [2] | TNTC | 14 | TNTC |
| 5 | 96 | TNTC [2] | >100 | 14 | TNTC |
| 6 | 0.02 | TNTC [2] | 7.2 | 0.001 | TNTC |

[1] Transfers made at 48-hour intervals.
[2] TNTC = too numerous to count = $>10^7$.

In both Examples 1 and 2 it is evident that the complexes of my invention possess the ability to suppress bacterial growth over much longer periods of time than the individual amine compounds tested, which are well-known commercial biocides. For instance, it will be noted in the table of Example 2 that where the commercial biocide Arquad T–2C was employed in a concentration of 10 p.p.m., the bacteria passed through a growth cycle ranging from 25 million cells per milliliter through a maximum of more than 100 million cells per milliliter during the third and fifth day of the test, and still after 10 days the system contained a concentration of 96 million cells per milliliter. In contrast to these concentrations, it will be noted that the complex of propargyl alcohol and Arquad T–2C in the same relative concentration maintained bacterial growth over a 10-day period at a relatively constant level, demonstrating the inability of the test bacteria to become tolerant to such complexes under otherwise ideal growth conditions.

Other complexes contemplated by my invention and having biocidal properties similar to the complexes specifically mentioned in the above examples are those prepared from Arquad T–2C (a water-soluble blend of mono- and di-alkyl quaternary ammonium chlorides) and deca-5-yne-2,4,7,9-tetramethyl-4,7-diol, hexa-3-ol-1-yne and the adipic acid salt of N-coco trimethylene diamine, as well as the complex prepared from the latter diamine and deca-5-yne-2,4,7,9-tetramethyl-4,7-diol. These complexes are infinitely soluble in water. The fact that they can be formed readily with compounds such as deca-5-yne-2,4,7,9-tetramethyl-4,7-diol indicates that the bonding mechanism involved is associated with a charge distribution around the —C≡C— group, and is not simply hydrogen bonding, as might be expected with the —C≡CH group. It is possible that these complexes exist in water solutions as a subcolloidal micelles.

Regardless of their structure, it is apparent from the foregoing description that the complexes of my invention constitute a very practical contribution to the prolonged prevention of microbial growth to an unobjectionable extent in industrial treating water, and the like.

I claim:

1. A composition of matter prepared by contacting acetylene with an aqueous or organic solution of a mixture of monotallow quaternary trimethyl ammonium halide and dicoco quaternary dimethyl ammonium halide.

2. A composition of matter prepared by contacting acetylene with an aqueous or organic solution of a mixture of monotallow alkyl trimethyl ammonium chloride and dicoco alkyl dimethyl ammonium chloride, the average theoretical molecular weight of these chlorides being about 395.

3. A composition of matter prepared by contacting ethyl acetylene with an aqueous or organic solution of a mixture of monotallow trimethyl ammonium halide and dicoco quaternary dimethyl ammonium halide.

References Cited

UNITED STATES PATENTS

| 3,320,263 | 5/1967 | Wakeman et al. | 260—567.6 |
| 3,340,265 | 9/1967 | Wakeman et al. | 260—404 |
| 3,107,222 | 10/1963 | Riggs | 252—392 |
| 3,113,113 | 12/1963 | Marsh et al. | 252—392 |
| 3,107,221 | 10/1963 | Harrison et al. | 252—392 |

LEON ZITVER, Primary Examiner

M. W. GLYNN, Assistant Examiner

U.S. Cl. X.R.

260—999; 210—64; 260—340.5, 309.6, 502.15; 424—329